United States Patent Office 3,434,726
Patented Mar. 25, 1969

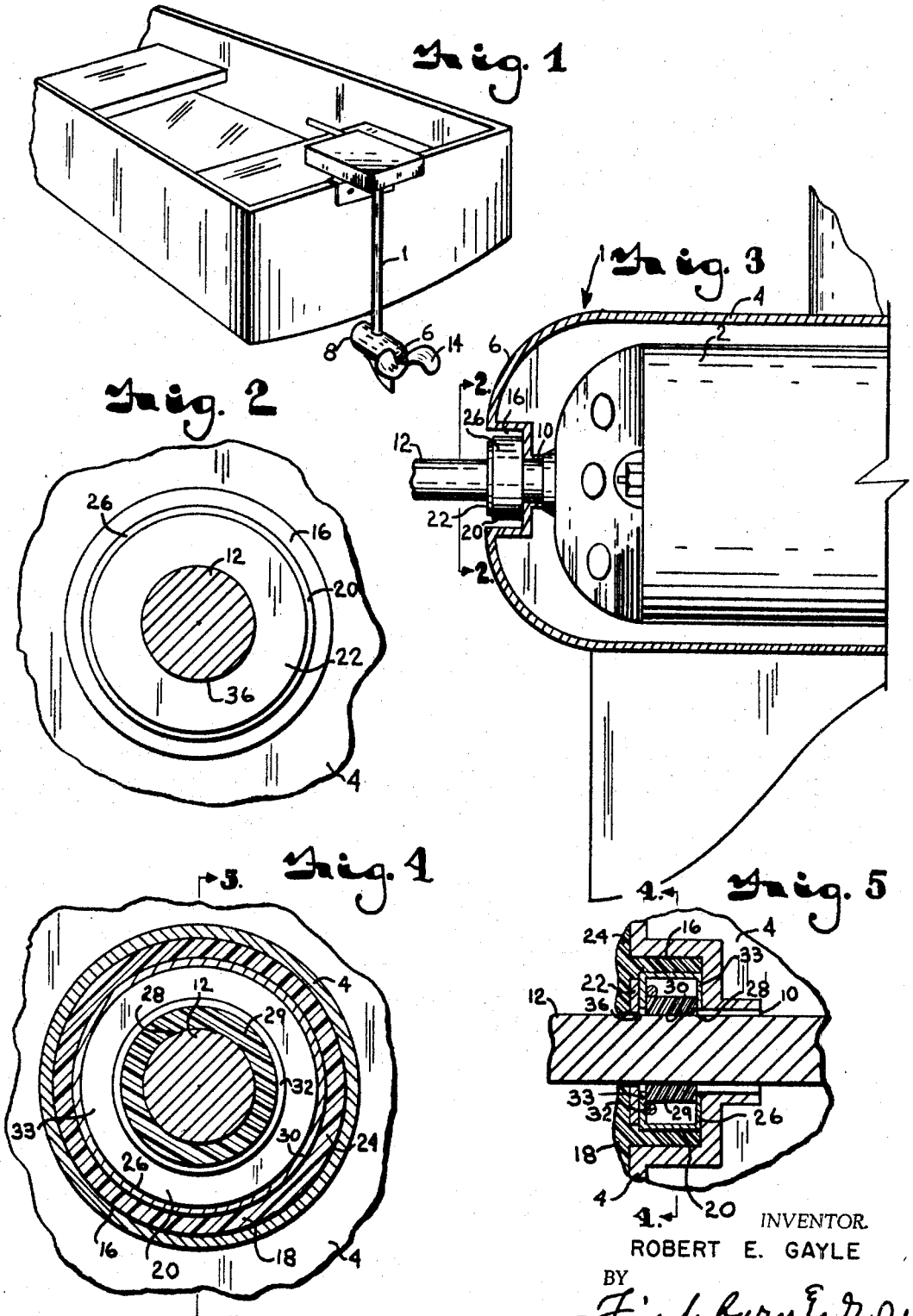

3,434,726
SHAFT SEALING MEANS FOR
UNDERWATER MOTORS
Robert E. Gayle, Shawnee Mission, Kans., assignor to
Phantom Products, a Division of Pflueger Corporation,
Akron, Ohio, a corporation of Ohio
Filed July 25, 1966, Ser. No. 567,756
Int. Cl. F16j 15/02
U.S. Cl. 277—36                          2 Claims

ABSTRACT OF THE DISCLOSURE

Apparatus for providing a watertight housing for underwater motors wherein a shaft for the propeller extends through an opening in one end of the housing and said end is recessed to receive a sealing element on the shaft within the recess, and said sealing element is spaced from the walls of the recess so that the recess may receive a settable sealing element and automatically align with the shaft and be closely associated therewith to prevent debris from winding around said shaft and getting into the motor, the sealing element preventing water from entering the motor housing.

This invention relates to water propulsion units and more particularly, to a new and improved rotary seal for use in sealing an opening in a watertight housing through which a rotatable shaft is extended.

Heretofore, considerable difficulty has been experienced in the water propulsion field as a result of the tremendous quantities of monofilament fishing tackle line existing today in our lakes and other bodies of water. These lines tend to entangle themselves about the propeller shafts of boat motors and due to their extreme hardness, effect considerable damage to resilient seals disposed about said shafts. This problem is particularly acute in relation to small electrical fishing motors wherein the motor itself is housed in a watertight casing beneath the surface of the water with an opening in said casing for passage therethrough of a rotatable shaft operatively connected to said motor. As the housing or casing must be maintained in a watertight condition to prevent damage or loss of the electric motor, a seal which is not susceptible to deterioration or failure caused by entanglement with fishing tackle is required. Similar difficulties have been experienced due to other material in the water, particularly sand particles.

The principal objects of this invention are: to alleviate the aforementioned difficulties in the art by providing a new and improved rotary seal for utilization in sealing openings through which rotatable shafts are disposed wherein a resilient sealing means engageable with the rotating shaft is protected from deterioration caused by contact with foreign objects such as fishing tackle line or sand particles; to provide such a rotary seal employing a covering means or a member exteriorly of a resilient sealing means with means for retaining said covering means and said sealing means in the desired relation and allowing self-adjustment of said means independently on said shaft avoiding problems of centering the sealing and covering means on the rotatable shaft; to provide such a rotary sealing device for utilization in sealing motor housings employed in underwater environments which may be constructed and installed with a minimum of expense and which effectively prevents deterioration of neoprene and other resilient seals caused by monofilament fishing tackle and further, prevents said fishing tackle from entangling about the shaft in the area of the resilient seal whereby the seal may be raised causing leakage to the interior of the housing damaging or destroying the power means within said housing.

Other objects and advantages of this invention will become apparent from the following description taken in connection with the accompanying drawings wherein are set forth by way of illustration and example certain embodiments of this invention.

FIG. 1 is a fragmentary perspective view of a boat having an electric fishing motor secured at its rear portion in a conventional manner, said motor being disposed beneath the surface of the water and having a housing containing a rotary seal about the opening through which the propeller shaft passes through said housing, said seal embodying the features of this invention.

FIG. 2 is a vertical sectional view taken on line 2—2 of FIG. 3 illustrating the position of the covering means and sealing means relative to the motor housing and shaft prior to application of an epoxy for retaining said sealing means and covering means in the desired position.

FIG. 3 is a vertical sectional view through the housing of the electric motor illustrated in FIG. 1 showing the relationship of the housing and motor with the shaft of said motor passing through an opening in said housing, said opening being sealed by a rotary seal embodying the features of this invention.

FIG. 4 is a vertical sectional view taken on line 4—4 of FIG. 5 illustrating the interior of the resilient seal and its casing and their relationship to the rotatable shaft.

FIG. 5 is a vertical sectional view taken on line 5—5 of FIG. 4 illustrating the sealing means and covering means in their cooperative relation with the shaft with an epoxy poured about said covering means and sealing means to secure said means in the desired relation with the housing and the rotatable shaft.

Referring to the drawings in more detail:

The reference numeral 1 broadly designates a water propulsion unit having a prime mover or engine 2 operatively mounted for employment beneath the surface of the water with said engine 2 being disposed within a watertight housing or casing 4. The housing 4, as illustrated, is generally cylindrical having a pair of opposed rounded end portions 6 and 8, the end portion 6 defining an aperture 10 therethrough which receives a rotatable shaft 12 for operative engagement with the propeller 14. The end portion 6 of the motor housing 4 further defines a recessed or notched portion 16 similar to a concavity or cup-shaped recess in communication with the opening 10 thereby forming said opening 10 in a countersunk manner. The recessed or countersunk portion 16, as illustrated, houses the sealing means 18 disposed in operable engagement about the rotary shaft 12 and employed to effectively seal the opening or passage 10 through the housing of the propulsion unit 1.

The rotary sealing means 18 broadly includes a sealing means 20, a covering means 22 and means for securing said sealing and covering means in desired relative positions and relative to the rotatable shaft 12 and housing 4. The combination of the sealing means 20, covering means 22 and securing means 24 cooperates to provide a new and improved rotary sealing means which will effectively seal an opening containing a rotary shaft and effectively protect the sealing means 20 from deterioration and failure caused by engagement with foreign objects such as monofilament fishing tackle.

Sealing means 20, as illustrated, is comprised of a casing 26 disposed in an angular ring defining an aperture 28 through the center portion thereof through which the rotary shaft 12 is received for rotational movement therein. The casing 26 houses a sealing material 29 of a resilient nature such as neoprene, said sealing material 29 being illustrated in a generally cylindrical configuration having an inner wall surface 30 defining a passage therethrough with said inner wall 30 being in sliding engagement with the rotary shaft 12. The inner wall 30 of the sealing material 29 is maintained in abutting sealing slidable relation to the rotary shaft 12 by means of a spring 32 disposed in a conventional manner within the casing 26. The casing 26 includes a pair of opposed side walls 33 disposed circumferentially about the rotary shaft 12 and having end portions in spaced relation from said rotary shaft 12 to prevent binding of the casing 26 with the rotary shaft 12 causing damage to the rotary shaft 12 and placing the sealing material 29 in binding engagement with the rotary shaft 12 thereby causing uneven wear on the sealing material 29.

The covering member 22, as illustrated herein, is a washer, disk or plate-like member defining an aperture 36 through its center portion for receipt of the rotary shaft 12. The aperture 36 has a slight clearance about the rotary shaft 12 to prevent wear of the shaft 12 and the covering means 22; however, said clearance is sufficiently slight such that any disposition of the covering means 22 relative to the rotary shaft 12 provides less clearance than the diameter of a monofilment fishing tackle line or other types of tackle to thereby prevent the entry of such line into the area between the seal 20 and the rotary shaft 12 to cause failure of the seal 20 and inflict damage and wear on the sealing material 39.

The covering means 22 and the sealing means 20 are secured in a desired relative position to one another and to the shaft 12 and housing 4 without securing said covering means 22 and said sealing means 20 rigidly together as by welding. It has been found that such a rigid installation, wherein the covering means has only a slight clearance of the rotary shaft 12, results in binding of the sealing material 29 thereby causing uneven wear to said sealing material 29 and premature failure of the watertight housing.

In the illustrated embodiment, the covering means 22 and sealing means 20 are secured to the housing 4 of the propulsion unit 1 by the securing means 24 such as an epoxy resin which is disposed over and throughout the recessed or countersunk portion 16 of the housing 4, the sealing means 20 and the covering means 22 to provide an effective bond of the sealing means 20 and covering means 22 to the housing 4 yet allows relative movement between the sealing means 20 and the covering means 22 during rotation of the shaft and until the epoxy sets or hardens such that said means may individually adjust themselves to the particular rotation of the particular shaft without the necessity of expensive centering and locating of the sealing means 20 and covering means 22 relative to the shaft 12.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a watertight housing for underwater motors having an opening in one end thereof for receiving a rotatable shaft, the end wall of the housing surrounding said opening being recessed and including an annular side wall and a bottom wall, sealing means comprising:
    (a) a casing in said recess comprising an annular ring defining an aperture through the center portion thereof through which said shaft extends and having an axially extending wall spaced from said annular side wall of said recess providing a first annular space between said casing and said annular side wall, said casing having outer and inner radially inwardly extending end walls attached to said axially extending wall, the inner end wall engaging the bottom wall of said recess,
    (b) a tubular neoprene sealing member on said shaft within said casing having its ends engaging against the end walls of said casing, and its outer periphery spaced from said axially extending wall of said casing providing a second annular space,
    (c) a cover member on said shaft engaging said outer end wall of said casing, and
    (d) an epoxy resin material surrounding said shaft and received within said first annular space for covering said casing and said cover whereby during hardening of said epoxy resin material the seal is automatically located in aligned position with said shaft.

2. The combination of claim 1 including spring means in said second annular space for maintaining said sealing member in sealing relation to said shaft.

References Cited

UNITED STATES PATENTS

| | | | |
|---|---|---|---|
| 2,794,662 | 6/1957 | Reynolds | 277—37 |
| 2,964,339 | 12/1960 | Macks | 277—35 |
| 3,147,014 | 9/1964 | Ohnstad | 277—189 |
| 3,154,309 | 10/1964 | Voitik | 277—35 |

FOREIGN PATENTS

| | | |
|---|---|---|
| 1,431,467 | 1/1966 | France. |

LAVERNE D. GEIGER, *Primary Examiner.*

JEFFREY S. MEDNICK, *Assistant Examiner.*

U.S. Cl. X.R.

277—163, 188